United States Patent [19]

Firmani

[11] Patent Number: 4,792,829
[45] Date of Patent: Dec. 20, 1988

[54] LIGHT-EXPOSURE CONTROL UNIT

[76] Inventor: Alexander D. Firmani, 6 Williams Ct., Newark, Del. 19702

[21] Appl. No.: 847,740

[22] Filed: Apr. 3, 1986

[51] Int. Cl.$^4$ .............................................. G03B 27/80
[52] U.S. Cl. ......................................... 355/38; 355/68
[58] Field of Search ........................ 355/38, 68, 69, 83

[56] References Cited

U.S. PATENT DOCUMENTS

| 3,027,801 | 4/1962 | Simmon | 355/38 |
| 3,100,419 | 8/1963 | Clapp | 355/38 |
| 3,521,952 | 7/1970 | Nelson et al. | 355/38 |
| 3,576,370 | 4/1971 | Kuhn | 355/38 X |
| 3,724,946 | 4/1973 | Knapp et al. | 355/38 X |
| 3,724,954 | 4/1973 | Dreyfoos, Jr. | 355/38 X |

Primary Examiner—L. T. Hix
Assistant Examiner—D. Rutledge

[57] ABSTRACT

An improved light-exposure control unit for a photographic printer offering minimized leakage problems, elimination of special precision capacitors and a range selecting circuit which eliminates masking of the photosensitive device used to detect variations in intensity of the light source. The improved control unit including operational amplifiers connected to the photosensitive device, which is mounted after the color filter but before the negative, sending a voltage adjustable according to the desired range and proportional to the amount of light impinging thereon, to an integrating amplifier with a variable input resistance adjusted accordingly to the desired density. The integrating amplifiers output is compared to a voltage derived from a precision reference source adjustable according to the settings made to magnification and speed-factor controls. The length of the exposure period is the time period required for the integrating amplifiers output to reach equality with this voltage and is controlled automatically by the amount of light impinging upon the photosensitive device, from the source, through the color filter.

17 Claims, 5 Drawing Sheets

LIGHT-EXPOSURE CONTROL UNIT

BACKGROUND OF THE INVENTION

1. Field of the Invention

This invention relates to an improved exposure control unit which is used advantageously in the exposing of light-sensitive materials such as photographic film or paper, either monochrome or color.

The improved control unit of the present invention may be used in the production of all types of photographs and particularly special purpose photographs, such as for advertising or other commercial or governmental purposes, where the photographs to be produced are not of the fixed magnifications ordinarily used in the exposing of photographic prints for the public.

2. Description of prior art

The object of the present invention is to provide an improved design for the apparatus claimed within U.S. Pat. No. 3,512,952. Wherein said apparatus presents electrical phenomenon that complicate construction and requires rare and expensive components that deem the design impractical for mass production, specifically, there are high quality precision capacitors with non-standard values employed in the capacitor network used for density factor. These capacitors must be made to specification by a manufacturer at an exorbitant cost. The apparatus claimed utilizes a phototube to discharge the capacitor network and a triode to monitor the voltage on the capacitor network, this arrangement has inherent leakage due to the high input impedance at the grid of the triode requiring careful construction techniques and low leakage components such as TEFLON® tube sockets and wire. There are no provisions on the claimed apparatus for range selection, it is customary to mask the phototube with light-attenuating neutral density filters in order to provide longer exposure times. If the operator requires shorter exposure times circuit modifications are required. Today a wide variety of photographic materials are available with many rated speeds making this a serious consideration for improvement.

The new design of the present invention is functionally identical from the operators viewpoint but constitutes an entirely different design approach.

The new design employs an integrator with an adjustable input resistance adjusted accordingly to the desired density. The integrator utilizes precision resistors and one high quality capacitor with a moderate tolerance that are readily available at a reasonable cost. The new design of the present invention eliminates high impedance nodes with a photodiode/operational amplifier front end connected to the input resistance of the integrator. This arrangement permits voltage control of the charging rate of the integrators capacitor, the voltage being a function of light intensity thus creating the integral of intensity relevant to both inventions. Part of the operational amplifier front end contains means for adjusting the proportionality of the voltage providing ranges for the exposure control system. Further advantages of the present invention are greater accuracy, reliability and stability attributed to its modern solid state construction.

BRIEF SUMMARY OF INVENTION

This invention is directed to a device for controlling automatically the exposure in making of prints, either monochrome or color, regardless of magnification. The automatic exposure device of the present invention makes it possible for a person relatively un-skilled in photographic techniques to produce special purpose photographs which heretofore have required the skill and time of the professional photographic processor.

A typical example of the use of the exposure device of the present invention would be as follows: A photographic print for advertising or other commercial purposes is to be produced. The professional processor, based on his or her experience, makes a first test print of small size, such as 4"×5". The processor and the client examine the test print. They decide (1) that the print should be 11"×14", (2) that a different printing material should be used, (3) that the density should be increased, and (4) that the color balance be changed such that the red tones would be more subdued and the blue tones accentuated. Having made these decisions, the next question is: What effect will these changes have on the exposure required for the printing as compared with the exposure used in making the test print? This question is answered automatically by the exposure device provided by the present invention. The processor may now turn the matter over to an operator not highly trained or skilled in photographic processing techniques. The operator, using available tables and charts, sets the controls on the exposure device to correspond to the new magnification factor (to accommodate for the desired enlargement and reciprocity factor), to correspond to the new speed-factor (to accommodate for the new type of printing material) and to correspond to the new density factor (to accommodate for the increase in density desired). The operator alters the color of the exposing light to achieve the desired change in color balance, then depresses the start button on the exposing device of the present invention and the device controls automatically the exposure for making the final print.

Further objects and advantages of the invention will become apparent from the drawings and ensuing description thereof.

DETAILED DESCRIPTION OF THE PREFERRED EMBODIMENT

Figure 1:
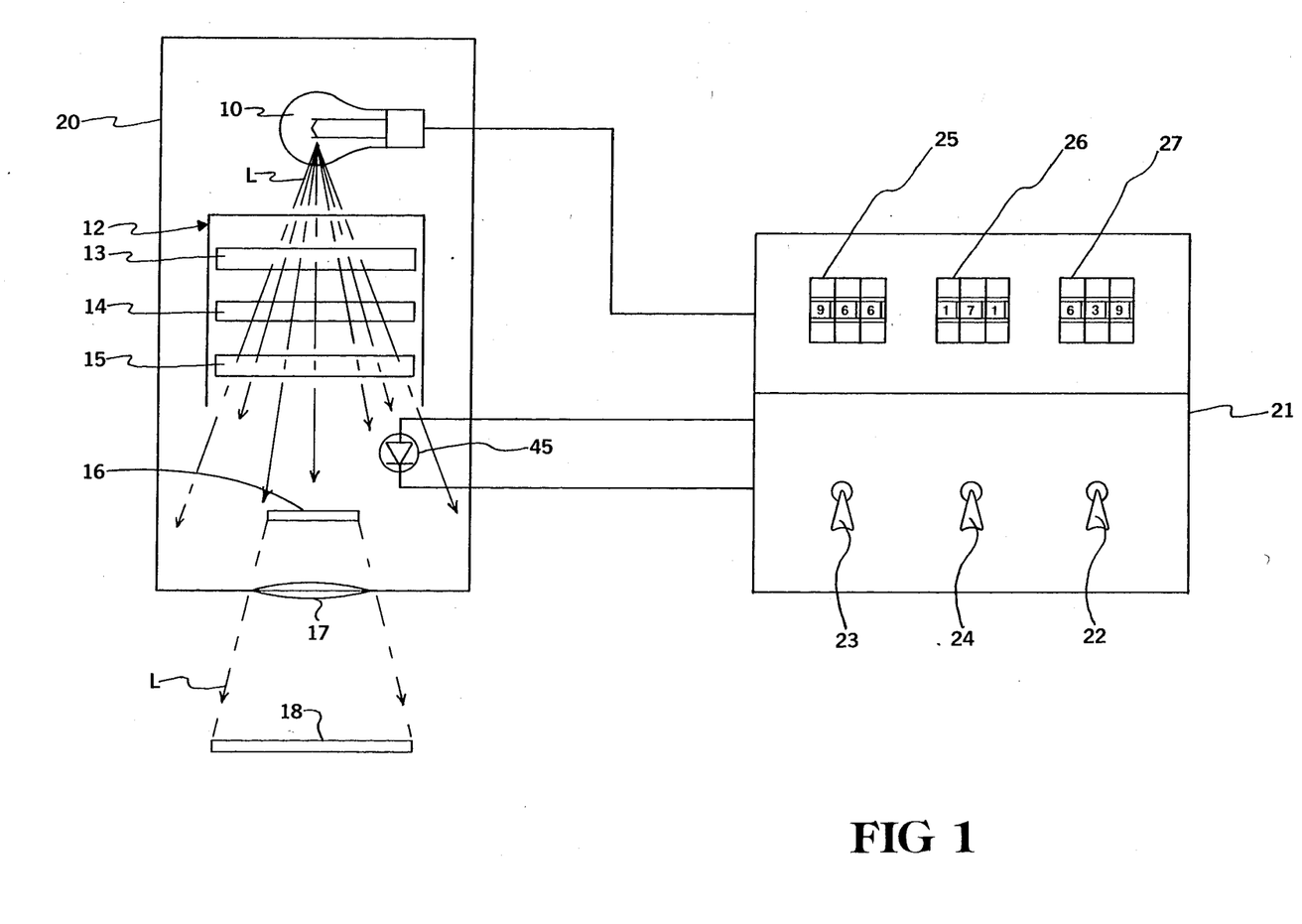
FIG. 1 is a simplified diagrammatic representation of a photographic enlarging system employing the automatic exposing device of the present invention.

Referring now to FIG. 1 there is shown diagrammatically a photographic enlarger system comprising a light source or lamp 10, a multi-color filter 12, a photographic negative 16, a focusing lens 17, and the printing material 18 contained in or supported by a housing 20, but no effort has been made to illustrate the structural mounting details since such means are well known.

The multi-color filter is shown to include three different color filter elements 13, 14, and 15 which, in a typical case, will be cyan, magenta and yellow. Each of the color filter elements 13, 14, and 15 is also of varying density, increasing progressively in density from one marginal region to the other, and each filter element is separately adjustable, so by adjusting the filter elements 13, 14, and 15 a wide range of color filtration may be obtained. The lamp 10 and the multi-color filter 12 may, if desired, be a device known as a Chromega D. Lamphouse, a produce of Simmon Brothers, Inc. of New York State, embodying U.S. Pat. No. 3,027,801.

In accordance with the present invention, a photodiode 45 is disposed with the housing 20, in a position to receive the filtered light from the light source 10. Preferably, the photodiode 45 is disposed within the housing 20 between the color filter 12 and the negative 16, but located to one side of the negative, in such position that the photodiode 45 is within the filtered light which is directed to the negative 16. Positioning the photodiode between the color filter and the negative, rather than between the negative and the printing paper, is deemed important, at least to the preferred embodiment of the present invention.

A control box 21 is provided having on its front panel a focus on-off toggle switch 22, a power on-off toggle switch 23, a springbiased momentary toggle type start/-stop switch 24, a material speed factor control switch bank 25, a magnification control switch bank 26, and a density factor control switch bank 27, inside the control box 21 is a power supply circuit and an exposure control circuit, shown schematically by adjoining FIGS. 2a, 2b, 2c, and 2d in sequence from left to right.

Figure 2A:
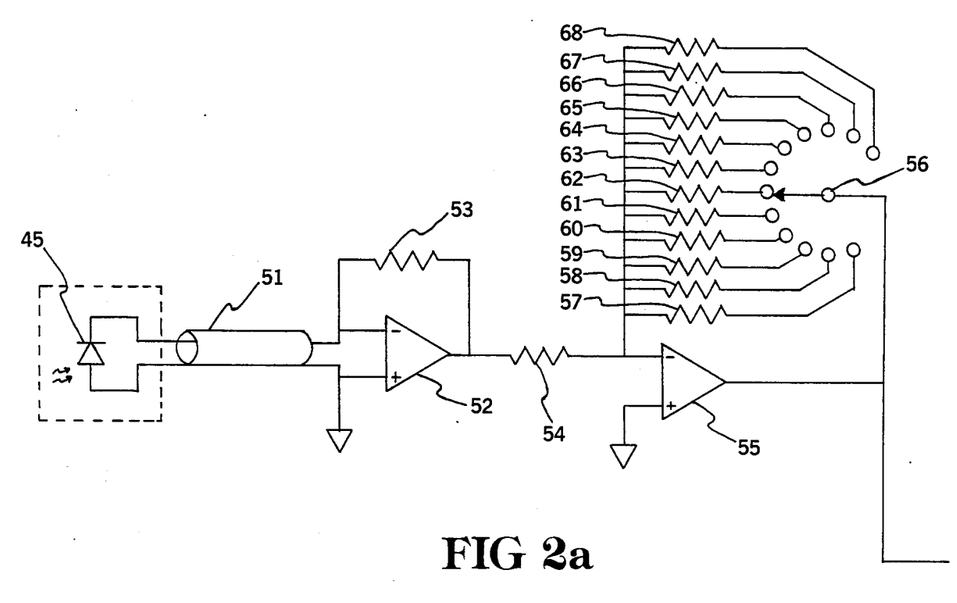
FIGS. 2a, 2b, 2c, and 2d when adjoined in sequence from left to right present a schematic circuit diagram of the control system and power supply for the exposing device.
Figure 2B:
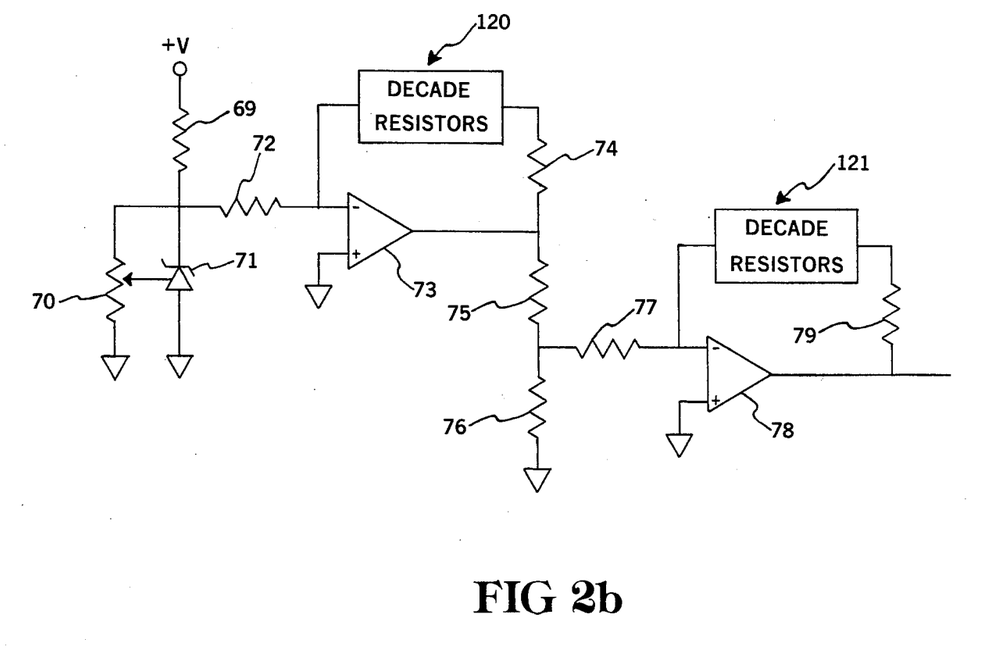
Figure 2C:
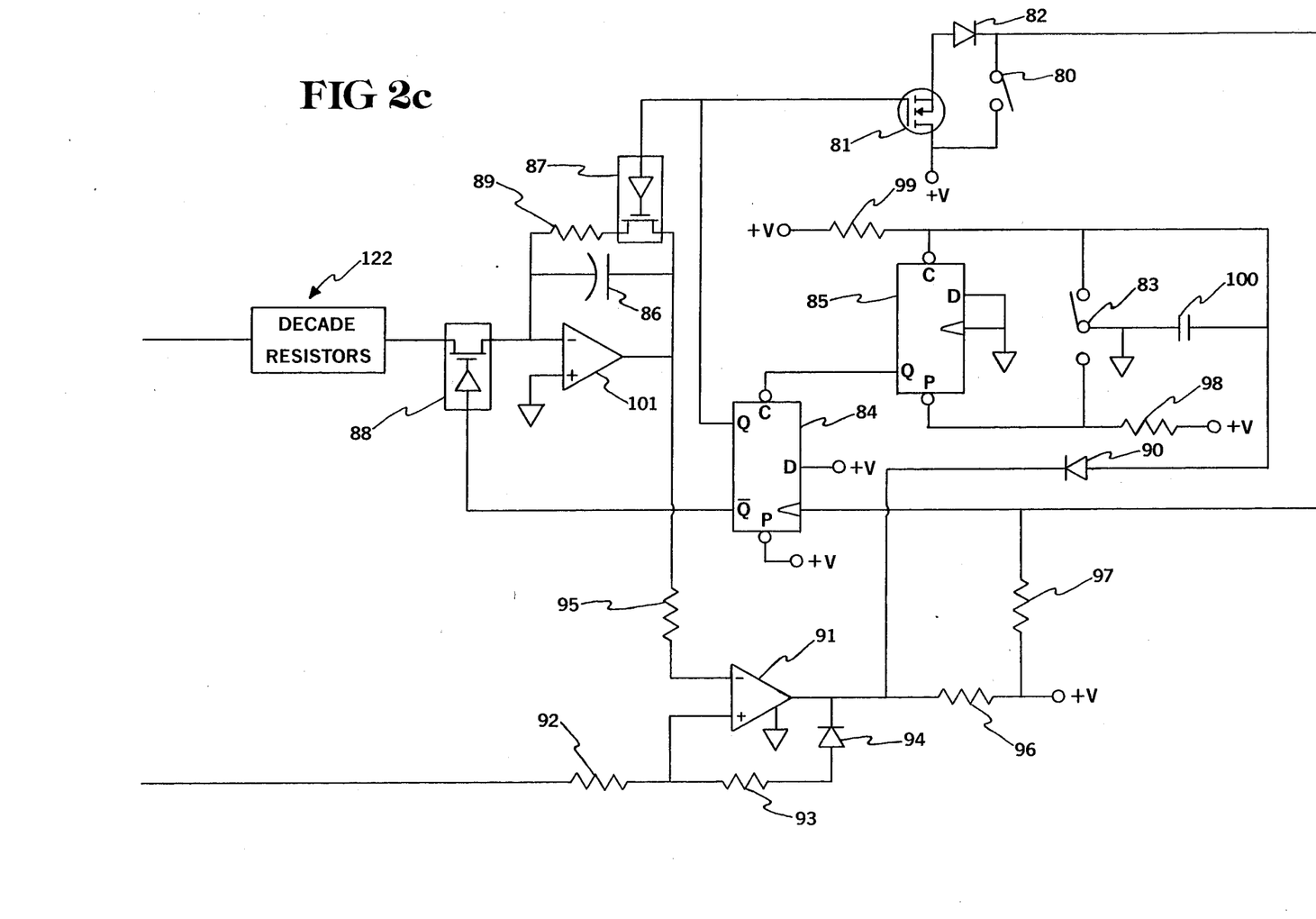
Figure 2D:
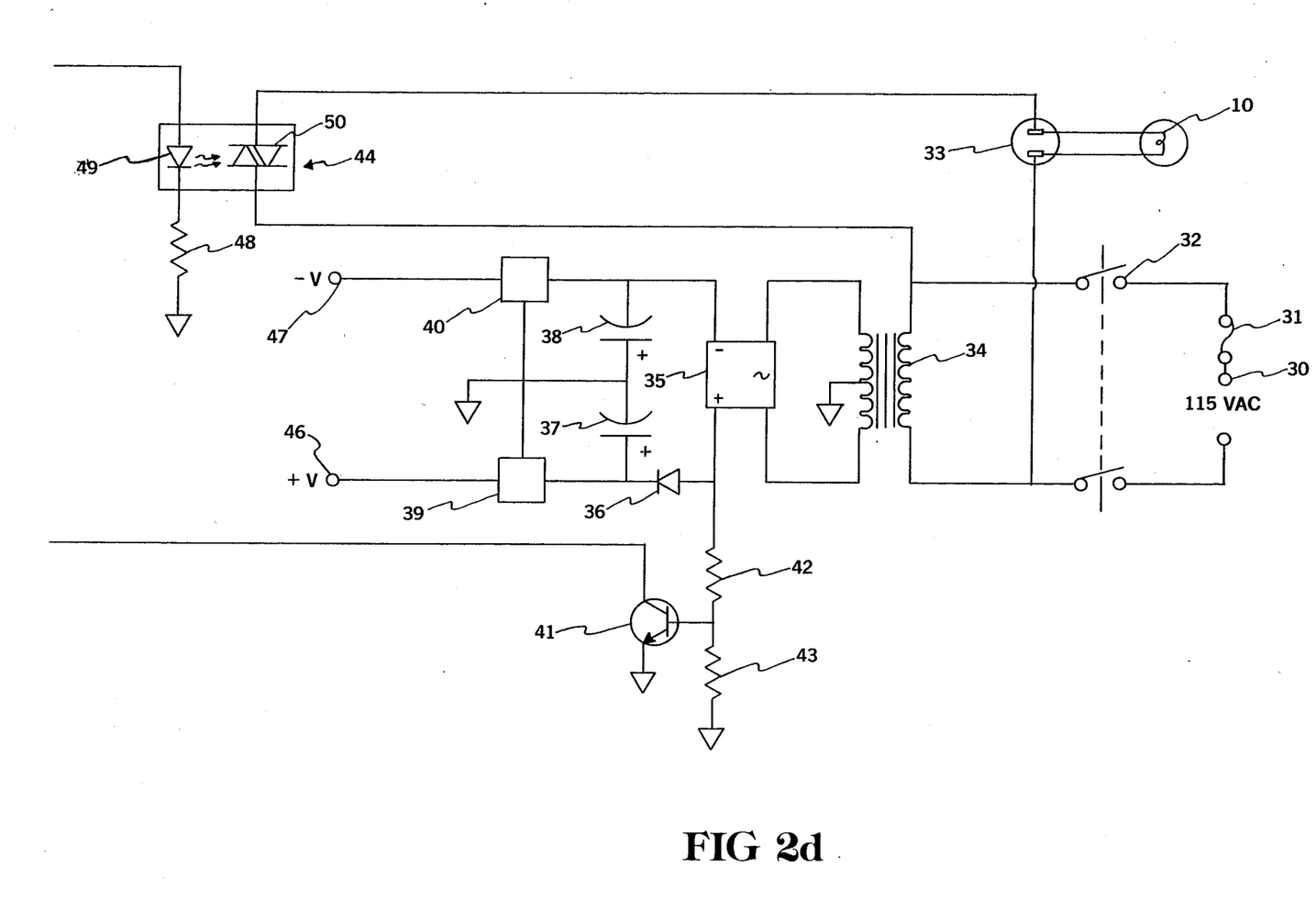

Referring now to FIG. 2d, which shows schematically a suitable power supply circuit. The terminals 30 are connected to a suitable source of power, for example, a 115 volt alternating current line. Reference numeral 31 identifies a fuse; 32 is a double-pole power switch controlled by toggle 23 on the control box 21 (FIG. 1); 33 is a socket for receiving the plug of a cord connected to the light source or lamp 10; 34 is a step down transformer supplying full wave bridge rectifier 35 with current from its 34 volt center tapped secondary winding; capacitors 37 and 38 filter the pulsating direct current developed by bridge rectifier 35. Power for the exposure control circuit provided at terminals 46 and 47 is regulated by integrated circuit positive voltage regulator 39 and integrated circuit negative voltage regulator 40 to +15 volts and −15 volts respectively. Transistor 41 a common emitter switch, biased by resistors 42 and 43, creates 120 Hz. pulses synchronous with the zero crossover region of the line frequency. Diode 36 isolates transistor 41 and associated components from the D.C. voltage imposed across filter capacitor 37. Switching for the light source or lamp 10 is accomplished by a solid state relay 44. This modern relay device is shown to contain two basic internal components, a light activated thyristor switch 50 and an infra-red light emitting diode 49. Power to the light source or lamp 10 is switched on when current is applied to the infra-red light emitting diode 49, through limiting resistor 48. This current causes infra-red light to be emitted by the diode 49 and this infra-red light, in turn, causes the light activated thyristor switch 50 to conduct maintaining a high degree of isolation between the control circuitry and the power lines.

FIG. 2a shows a photodiode 45, connected in the photovoltaic mode, through a coaxial cable 51 (that may be extended 20 feet or so to the lamp housing) to an operational amplifier 52 that converts current created by the photodiode 45 as a result of its short circuit termination, into an output voltage proportional to the amount of light impinging thereon. The magnitude of this voltage is fixed to the desired white light level by resistor 53 and will decrease as the density of the filter elements 13, 14, and 15 (FIG. 1) increases. Resistor 53, may if desired, be variable to allow for precise trimming of the proper exposure time.

Operational amplifier 55 gain setting resistors 54 and 57 through 68 along with twelve position rotary switch 56 provide an internal calibration adjustment for the range of the exposing device. Gain steps were chosen to duplicate the attenuation values that would be achieved if the photodiode 45 were masked with commercially available neutral density filters. These gain steps may also include amplification to provide shorter exposure times. Switch 56 is adjusted upon installation of the exposing device for the range needed to satisfy the time requirements of the printing material 18. To further enhance an understanding of this range selecting circuit the following list of resistor values are given:

54=100K 1%
57=10.0K 1%
58=12.4K 1%
59=16.2K 1%
60=20.0K 1%
61=24.9K 1%
62=31.6K 1%
63=40.2K 1%
64=49.9K 1%
65=63.4K 1%
66=80.6K 1%
67=100K 1%
68=121K 1%

Referring now to FIG. 2b which shows a reference diode 71, biased by resistor 69 and made adjustable by trimming potentiometer 70 for a precision 2.50 volts at the reference diodes cathode. This precision voltage is amplified and inverted by the gain of operational amplifier 73 made adjustable according to the desired magnification by a decade resistor network 120 in its feedback loop. An equivalent circuit and truth table for the decade resistor network, composed of precision resistors and switches, is shown in FIGS. 3 and 4 respectively.

Figure 3:
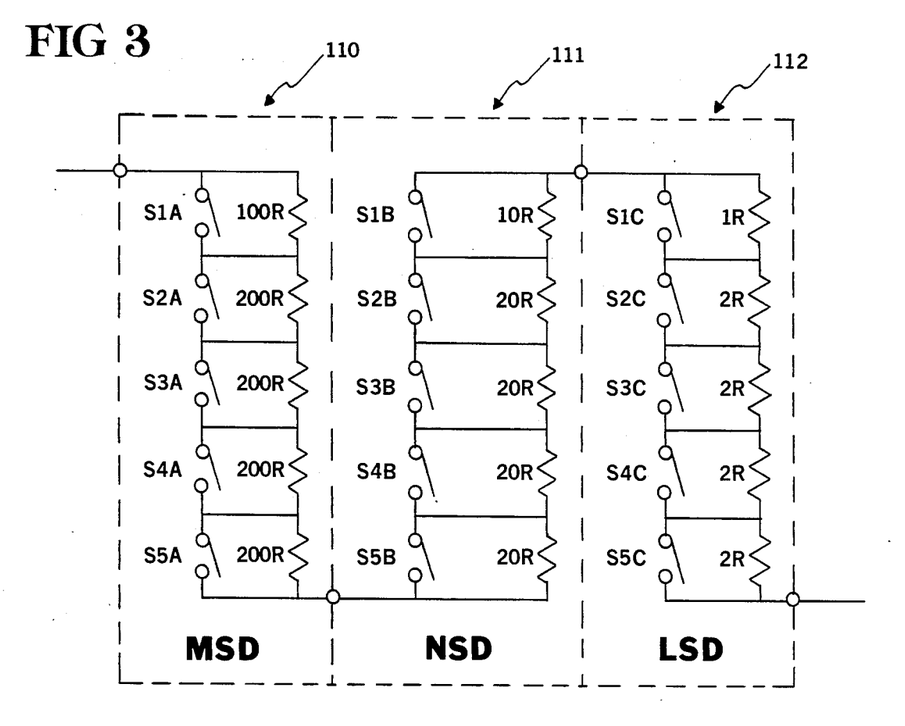
FIG. 3 is an equivalent circuit diagram for the decade resistance switching devices employed in the control system of the present invention.
Figure 4:
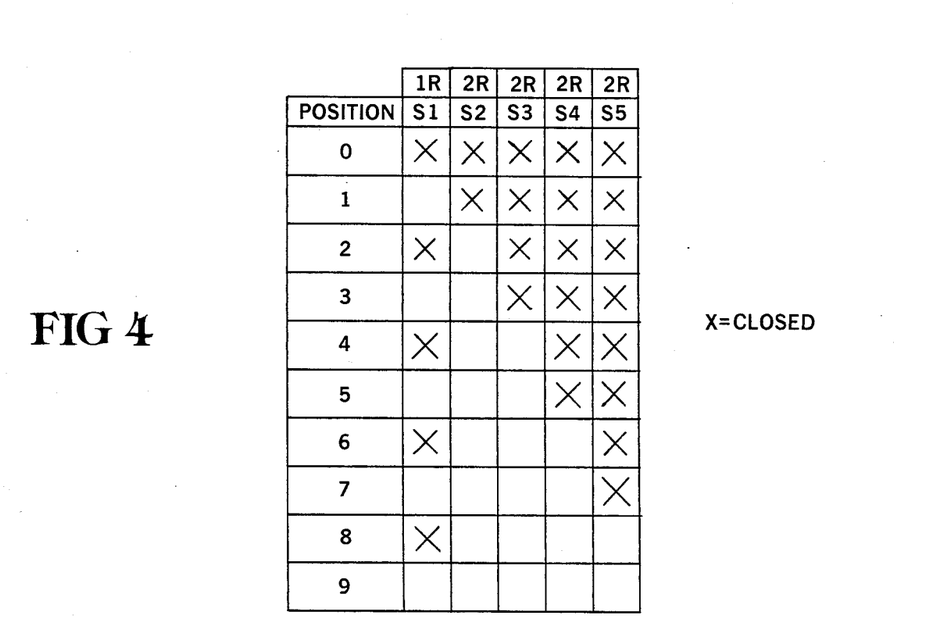
FIG. 4 is a truth table for a single section of the decade resistance switching devices employed in the control system of the exposing device.

Referring now to FIG. 3 there is shown three digit sections in series, a most significant digit (MSD) 110, a next significant digit (NSD) 111, and a least significant digit (LSD) 112 which are identical with exception to the resistors values.

Physically the switches S1 through S5 are combined into a rotary thumbwheel device with numerical markings on the body and the three sections, composed of three such devices, are joined together to form one bank of three decades. Switches S1 through S5 are actuated in a 1-2-2-2-2 code best described by the truth table of FIG. 4 and upon careful examination of FIGS. 3 and 4 it will become apparent that the three decade resistor network can produce one thousand different values of resistance ranging from zero ohms to 999K ohms when the value for the factor "R" in FIGS. 3 and 4 is equal to one kilohm.

Referring once again to FIG. 2b operational amplifier 73 exhibits a gain of negative unity to negative four when resistors 74 and 72 are equal to one third of the maximum resistance of decade resistor network 120 (333 kilohms) having available at its output one thousand voltages within the range of −2.50 volts to −10.0 volts relative to the desired magnification. This output voltage is then divided by a factor of four by the ratio of resistors 75 and 76 producing an overall stage gain of negative 0.250 to negative unity to allow the use of standard one and two prime values of resistors (such as one kilohm and ten kilohms or two kilohms and twenty kilohms) in the decade resistor networks for operational amplifiers 73 and 78.

The next stage comprising operational amplifier 78, resistors 77, 79 and decade resistor network 121 is identical to the previous stage (consisting of components 72, 73, 74, and 120) and exhibits identical gain characteristics adjustable according to the desired speed-factor by decade resistor network 121, therefore, the output of operational amplifier 78 is an adjustable voltage derived from the precision reference source of diode 71 adjustable according to settings made to magnification decade resistor network 120 and speed-factor decade resistor network 121 (controls 25 and 26 FIG. 1) relative to the present invention wherein said adjustable voltage is within the range of +0.625 volts to +10.0 volts.

Referring to FIG. 2c there is shown a focus switch 80, controlled by toggle 22 on control box 21 (FIG. 1) for energizing solid state relay 44 (FIG. 2d) therefore the lamp 10. A spring-biased momentary start/stop switch 83, controlled by toggle 24 (FIG. 1) for actuating D type flip flop 84, which synchronizes the control circuit to the 120 Hz. zero crossover pulses provided by transistor 41 (FIG. 2d) eliminating spurious power line noise. Flip flop 84 is controlled by the output of flip flop 85 which serves as a latch for the current status of the control system provided by comparator 91 and momentary start/stop switch 83. Operational amplifier 101 functions as an integrator with capacitor 86 as a feedback element and this integrator is controlled by D type flip flop 84 with CMOS switches 87 and 88 as an interface. Decade resistor network 122 is the input resistance for the integrating amplifier 101 and is variable according to the desired density-factor. This decade resistor network 122 is identical to those shown in FIG. 2b (120, 121) with exception to resistance. In order to keep integrating capacitor 86 small in value and size (1.5 mfd) a variable resistance of zero to 9.99 megohms is required ("R"=10K ohms for FIGS. 3 and 4). Resistor 89 protects CMOS switch 87 from large values of in rush current developed while discharging capacitor 86. Diode 82 isolates parasitic components of CMOS FET source follower 81, which functions as a buffer amplifier, from the shorting action of switch 80. Diode 90 isolates the output of comparator 91 from the shorting action of start/stop switch 83. Comparator 91 compares the output of integrating amplifier 101 to the voltage developed by the circuit of FIG. 2b, relative to the desired magnification and speed-factor, to determine the end of a timing cycle, resistors 92 and 93 provide hysteresis to prevent oscillations from within comparator 91. Resistor 95 minimizes error, due to input bias current, developed across resistor 92. Diode 94 isolates the non-inverting input of comparator 91 from the voltage imposed at its output by pull-up resistor 96 and is a germanium type for a low forward voltage. Resistors 97, 98 and 99 are needed to pull up the inputs of flip flops 84 and 85. Capacitor 100 insures that flip flop 85 will be cleared when the control circuit is energized.

The manner in which the exposure control device of the present invention operates will now be described by considering its use in photographic printing.

Assume that a test print of small size, such as 4"×5", has been made and that the processor and the client are examining the print. They decide that the print should be 11"×14", that it should be on different material, and that the red tones should be subdued and the blue tones accentuated, having made these decisions, the processor or his operator adjusts the enlarging device to provide the increased magnification, he adjusts the lens opening, and he adjusts the color filters 12. These adjustments are made in accordance with calibration tables and charts which are available to the operator.

Having done these things the operator next flips the power switch 23 to the on position. This closes the double-pole switch 32, in FIG. 2d, and turns on the power to the system. Next the operator may flip the focus switch 22 to the on position to close switch 80, of FIG. 2c, energizing solid state relay 44. This connects power to the enlarger lamp 10 and allows the operator to adjust the focus and compose the picture. The focus switch 22 is then returned to the off position, extinguishing the enlarger lamp 10.

The operator then adjusts thumbwheel switch bank 26 to read the new magnification factor, and in doing so he adjusts the feedback resistance of operational amplifier 73, of FIG. 2b, to provide a different voltage at its output. The operator then adjusts thumbwheel switch bank 25 to read a speed factor which corresponds to the rated speed of the printing material being used. The adjustment of switch bank 25 changes the feedback resistance of operational amplifier 78 (FIG. 2b) and the voltage at the output of operational amplifier 78 is adjusted accordingly thereby changing the voltage at the non-inverting input of comparator 91. The operator next adjusts thumbwheel switch bank 27 to achieve the desired density correction and in doing so removes connections for the particular resistor, or the particular combination of resistors, necessary to set the input resistance of the integrating amplifier 101 according to the desired density.

In the system of the preferred embodiment, as soon as the power switch 32 was closed, and before the timer start switch 24 is depressed, capacitor 100 held the clear input of flip flop 85 low therefore its Q output is low, consequentially holding flip flop 84 cleared. Integrating amplifier 101 is in the idle state through the action of CMOS switch 87, which is on, and CMOS switch 88, which is off, isolating the integrator from photodiode amplifiers 52 and 55. The enlarger lamp is not yet on so photodiode 45 is not yet illuminated. There is no voltage present at the outputs of operational amplifiers 55 and 101.

The operator then places printing material of the desired type in position and is now ready to make the exposure. He depresses the spring-biased momentary start/stop switch 24, to start the exposure device, momentarily grounding the preset input of flip flop 85 through the contacts of switch 83. The Q output of flip flop 85 immediately goes high releasing flip flop 84 from its cleared state. Upon the positive edge of the next zero crossover pulse, in a train of pulses present at the clock input of flip flop 84, output Q of flip flop 84 will go high. This will cause CMOS switch 87 to turn off and CMOS FET 81 to conduct applying voltage to solid state relay 44. The enlarger lamp 10 is now on. Simultaneously, the $\overline{Q}$ output of flip flop 84 goes low causing CMOS switch 88 to conduct. The integrating amplifier 101 is now active, photodiode 45 is illuminated, a voltage directly proportional to the intensity of the light in the housing 20, appears at the output of operational amplifier 55 therefore a current automatically variable by light intensity and preset according to density factor flows out of the virtual ground at the inverting input of operational amplifier 101. Operational amplifier 101 will consequentially source current through capacitor 86, into said virtual ground, causing a positive going voltage ramp with a slope automatically variable according to light intensity and manually variable according to density factor at its output. This ramp appears at the inverting input of comparator 91. It will reach equality with the voltage from FIG. 2b (relative to magnification and speed factor) present at its non-inverting input and the output of comparator 91 will switch to ground. Diode 94 will conduct creating hysteresis for the comparator 91 by the voltage divider action of resistors 92 and 93. Diode 90 will conduct clearing flip flops 84 and 85. The Q output of flip flop 84 will then go low extinguishing the enlarger lamp 10 and discharging capacitor 86 through resistor 89 via CMOS switch 87. Simultaneously the $\overline{Q}$ output will go high turning CMOS switch 88 off placing the circuit in its original condition ready for the next exposure.

At any time during the timing cycle switch 83 may be actuated to clear flip flop 85 and reset the circuit to its ready state.

It will be seen that the circuitry of FIGS. 2a, 2b, 2c, and 2d provide a control system for controlling the exposure of the sensitive material according to settings made to a plurality of adjustments relating to (1) magnification, (2) reactance, or photosensitivity, of the photosensitive material, (3) density factor, (4) light intensity, (5) range. The device of the present invention is designed to manually accept information on four of these factors. The system automatically compensates for changes in light intensity and changes in intensity resulting from adjustments to filter elements 13, 14, and 15.

Summarizing, the operator who has previously set the range of the exposure device adjusts control switches on the control unit to accommodate for the reactance of the sensitive material and for the magnification desired. These two adjustments control the voltage applied to a comparator that determines the exposure time from the voltage output of an integrator. The slope of the integrators voltage output, hence time, is manually adjustable by the settings made to control switches for density factor and automatically controlled by the intensity of the light received by the photodiode disposed within the lamp housing. The intensity of the light received by the photodiode is a function of the brightness of the lamp as determined by its ratings and the voltage applied thereto, and of the adjustments made to the color filters. Exposure time is therefore variable by all five of the previously mentioned factors.

While the preferred embodiment of this invention has been described in great detail, it will be obvious to one skilled in the art that various modifications may be made without departing from the scope of the invention. Therefore, the scope of the invention should not be determined by the embodiment illustrated, but by the appended claims and their legal equivalents.

I claim:

1. An improved exposure control unit for a photographic printer having a light source, an adjustable magnification factor, an adjustable lens aperature, an adjustable color filter, support means for the negative which is to be printed and support means for the material to be exposed, said exposure control unit improvements comprising:

(a) a photovoltaic cell mounted to receive color-filtered light from said source unchanged by said negative;

(b) circuit means in direct association with said photovoltaic cell for generating current within said photovoltaic cell and converting said current into an output voltage directly proportional to the intensity of the filtered light impinging upon said photovoltaic cell;

(c) first adjustable means for modifying the proportionality of said output voltage directly proportional to light intensity from said circuit means, said first adjustable means providing adjustment according to the range of said exposure control unit;

(d) a precision reference voltage source;

(e) second adjustable means providing a first variable multiple of said precision reference voltage, said second adjustable means providing adjustment according to the magnification factor of said photographic printer;

(f) voltage divider means associated to divide the output of said second adjustable means by a predetermined factor;

(g) third adjustable means in circuit association with the output of said voltage divider means for providing a second variable multiple of the divided voltage from said second adjustable means, said third adjustable means providing adjustment according to the speed factor of the sensitive material being exposed;

(h) integrating means providing a voltage ramp output representing the integral of its input current wherein the magnitude of said input current hence the slope of said voltage ramp output is manually variable by fourth adjustable means and automatically variable by a voltage representing light intensity from the output of said first adjustable means, said fourth adjustable means providing adjustment according to the desired density factor;

(i) comparator means in circuit association with the output of said integrating means and the output of said third adjustable means for terminating the exposure period, therefore said light source, when said output of said integrating means is equal to the output of said third adjustable means;

(j) momentary switch means for initiating or terminating said exposure period therefore said light source;

(k) first flip flop means for retaining the current status of said exposure control unit responsive to said momentary switch means and said comparator means output;

(l) means for creating pulses synchronous with the zero crossover region of the alternating power source energizing said exposure control unit;

(m) buffer amplifier means for energizing relay means in circuit association with said light source;

(n) second flip flop means responsive to said first flip flop means and to said pulses synchronous with said zero crossover region of said alternating power source, having complementary outputs for controlling said buffer amplifier means, and, switching means controlling the charging and discharging of a capacitor in circuit association with said integrating means.

2. Apparatus according to claim 1 wherein said photovoltaic cell is a visible light spectrum photodiode located between said color filter and said negative support means.

3. Apparatus according to claim 1 wherein said circuit means comprises a first operational amplifier means and a feedback resistance with said photovoltaic cell connected to provide a short circuit termination of said first operational amplifier means inputs.

4. Apparatus according to claim 1 wherein said first adjustable means comprises a second operational amplifier means with an input resistor and a plurality of feedback resistors in circuit association with selector switch means providing adjustment of said second operational amplifier means gain in predetermined steps representing the ranges of said exposure control device said ranges providing compensation for a wide variety of rated speeds for the photosensitive materials available for exposure.

5. Apparatus according to claim 1 wherein said second and third adjustable means comprises third and fourth operational amplifier means with associated input resistors and feedback resistances including first and second decade resistance networks.

6. Apparatus according to claim 5 wherein said first and second decade resistance networks comprise a plurality of sub-networks, connected in series, each sub-network comprising a multi-position decade resistor switch with a plurality of resistances of different values in circuit association with said decade resistor switch, providing values of total resistance for each said sub-network or all said sub-networks combined that relate to numerical markings associated with said decade resistor switches, within said decade resistance network, said sub networks being inter-related by powers of ten.

7. Apparatus according to claim 1 wherein said voltage divider means comprises two or more series resistors said output of said voltage divider means being at a node providing said predetermined factor.

8. Apparatus according to claim 1 wherein said integrating means includes a fifth operational amplifier means with said capacitor associated as a feedback element and a third decade resistance network, comprising said fourth adjustable means, providing a manually variable input resistance in circuit association with the output of said first adjustable means.

9. Apparatus according to claim 8 wherein said third decade resistance network comprises a plurality of sub-networks, connected in series, each sub-network comprising a multi-position decade resistor switch with a plurality of resistances of different values in circuit association with said decade resistor switch, providing values of total resistance for each sub-network, or all sub-networks combined that relate to numerical markings associated with of said decade resistor switches, within said decade resistance network, said subnetworks being inter-related by powers of ten.

10. Apparatus according to claim 1 wherein said comparator means includes positive feedback elements for providing stable operation of said comparator means.

11. Apparatus according to claim 1 wherein said first flip flop means is a bi-stable latch responsive to said momentary switch means and said comparator means output.

12. Apparatus according to claim 1 wherein said current status comprises the last actuation of said momentary switch means or the last actuation of said comparator means.

13. Apparatus according to claim 1 wherein said second flip flop means is responsive to the output of said first flip flop means and the output of said means for creating pulses synchronous with the zero crossover region of the said alternating power source.

14. Apparatus according to claim 1 wherein said second flip flop means is activated and de-activated by said first flip flop means and said complementary outputs of said second flip flop means are activated synchronously with said pulses synchronous with said zero crossover region of the said alternating power source.

15. Apparatus according to claim 1 wherein said complementary outputs are in circuit association with said buffer amplifier means and said switching means, allowing said buffer amplifier means to be activated when said capacitor, in circuit association with said integrating means is charging and de-activated when said capacitor is discharging.

16. Apparatus according to claim 15 wherein said buffer amplifier means controls said light source through said relay means.

17. Apparatus according to claim 1 wherein said switching means comprises a first switching element in series with said fourth adjustable means and a second switching element in parallel with said capacitor, said first switching element controlling said input current of said integrating means and said second switching element controlling the discharge of said capacitor.

* * * * *